No. 651,136. Patented June 5, 1900.
P. H. DUDLEY.
INSTRUMENT FOR TESTING RAILS UNDER MOVING TRAINS.
(Application filed Nov. 10, 1898.)
(No Model.) 3 Sheets—Sheet 1.
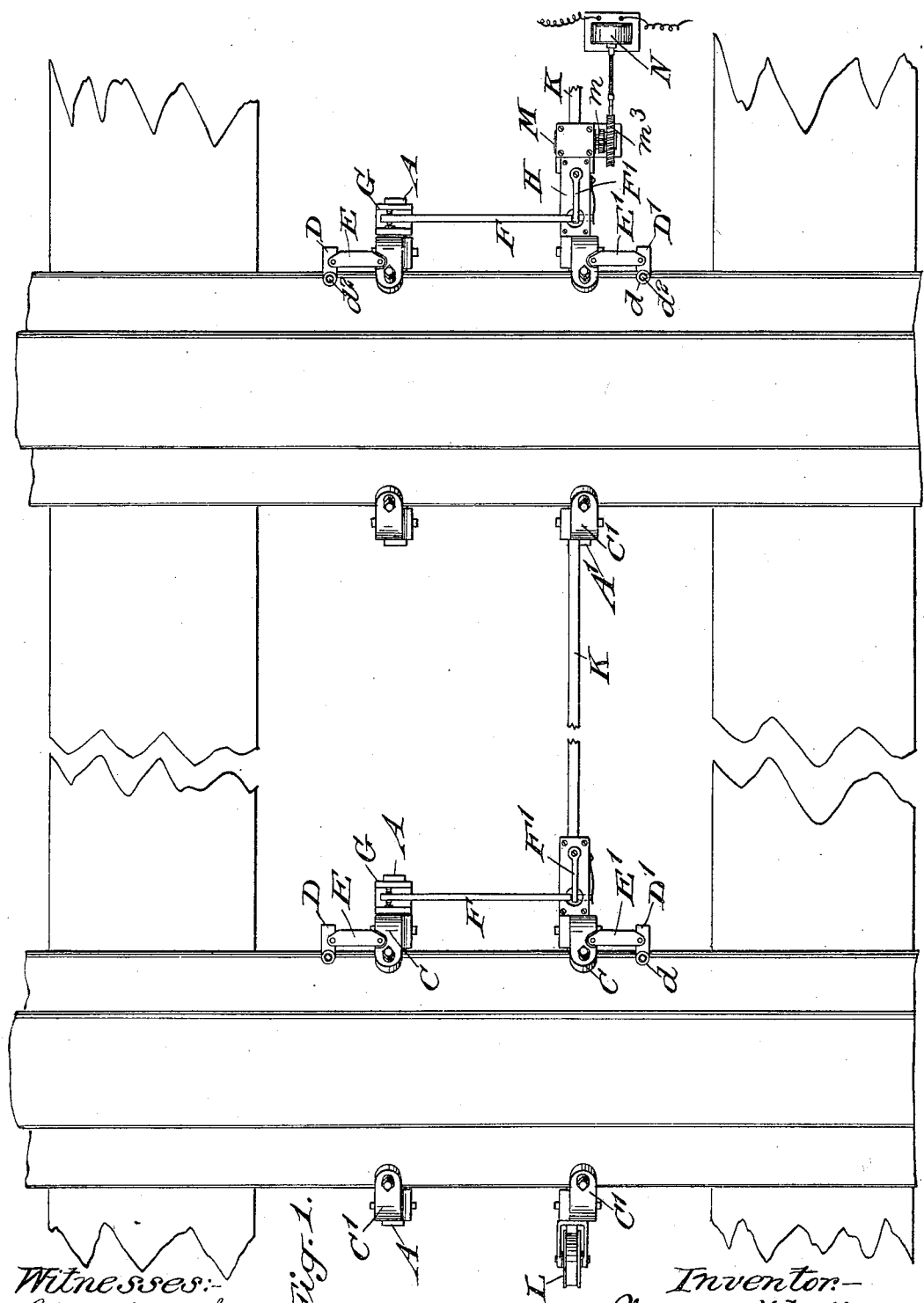

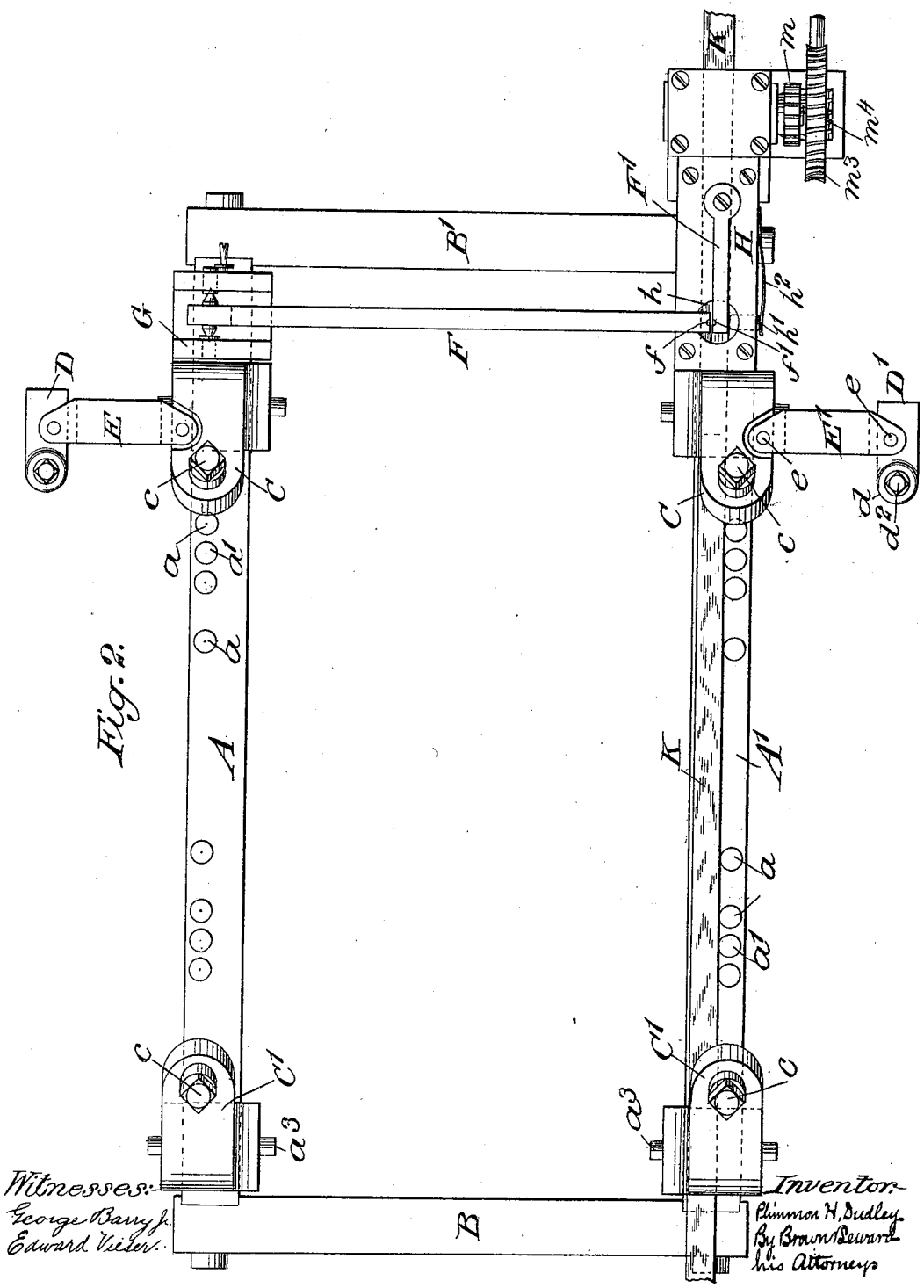

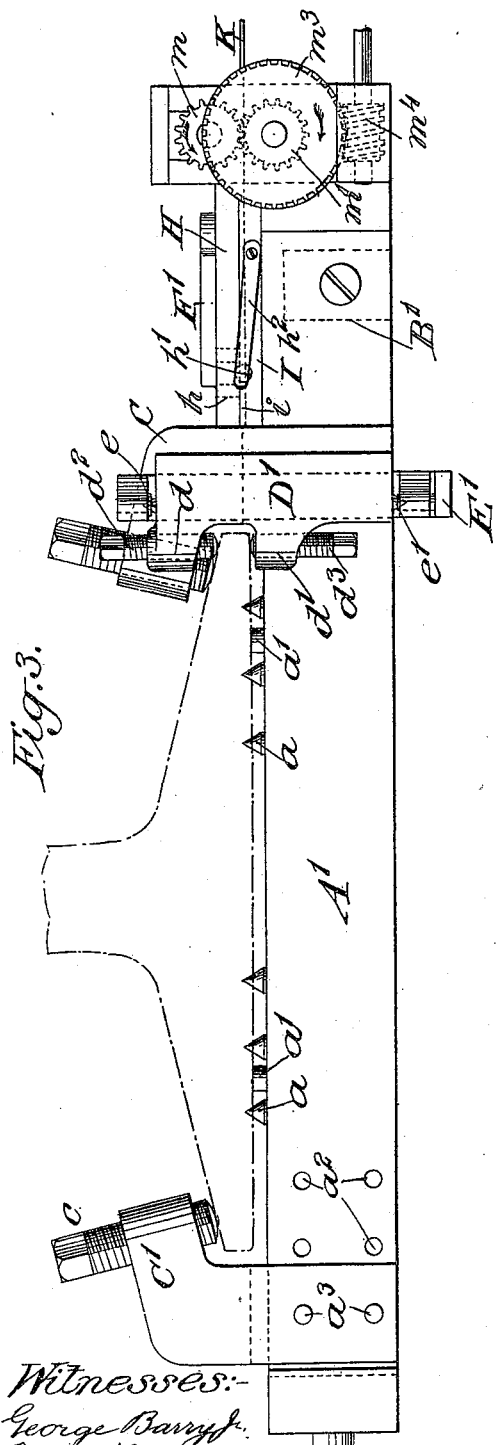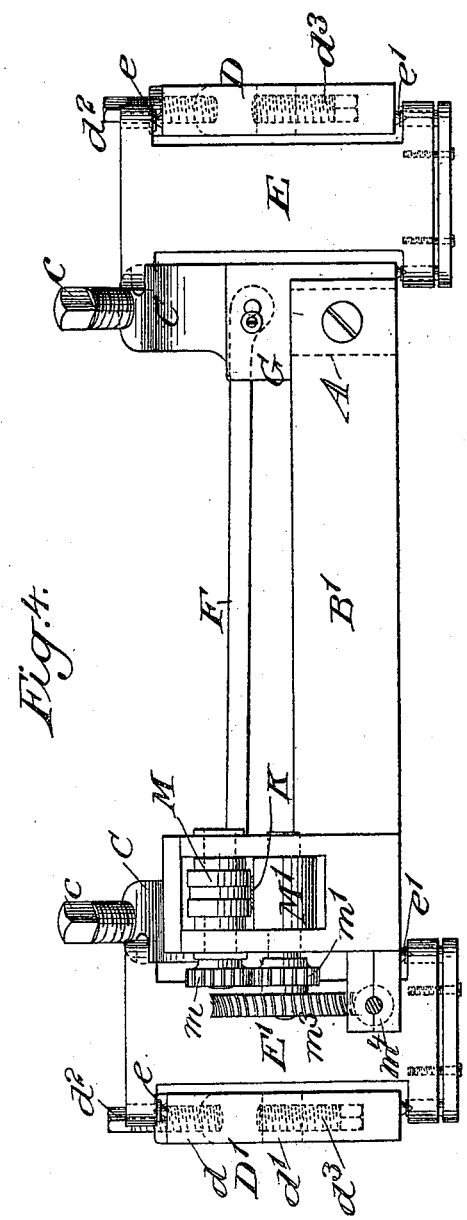

UNITED STATES PATENT OFFICE.

PLIMMON H. DUDLEY, OF NEW YORK, N. Y.

INSTRUMENT FOR TESTING RAILS UNDER MOVING TRAINS.

SPECIFICATION forming part of Letters Patent No. 651,136, dated June 5, 1900.

Application filed November 10, 1898. Serial No. 696,004. (No model.)

*To all whom it may concern:*

Be it known that I, PLIMMON H. DUDLEY, a citizen of the United States, and a resident of New York, in the county and State of New York, have invented a new and useful Improvement in Instruments for Testing Rails Under Moving Trains, of which the following is a specification.

My invention relates to an improvement in instruments for testing rails under moving trains, and is directed more particularly to means for preventing the supporting-frames from a rolling or rocking action due to shock of a rapidly-moving engine or car and for simultaneously recording the effect of the moving engine or car upon the two rails of the track. To this end I connect the members of a pair of instruments, each member secured to one of the rails of the track at points in the track transversely opposite each other by a record-receiving strip having the same rate of movement through each instrument in order to ascertain whether or not the elongation or compression of one of the rails under the moving train was greater or less than the elongation or compression of the companion rail at any given instant. This knowledge becomes of great importance in the final determination of the question whether the rail is or is not sufficiently stiff to carry loads required of it, for the reason that there is more or less weight temporarily thrown upon a rail under a moving train by the sidewise roll or rocking movement of the engine or car, due in part to the fact that the cranks and counterbalances on the opposite wheels of a pair of drivers must be set at right angles one to the other to avoid dead-centers. This produces when the engine is being forced along the track a slight vertical undulatory movement at each revolution of the drivers at each side of the engine and a decrease or increase of the stresses in the rails under each wheel according to the position which the wheels for the entire wheel-base of the locomotive occupy in the undulatory movement. The total stresses for the weight of the locomotive when referred to the center of gravity remain practically constant for a given speed, notwithstanding the individual variations for each particular wheel, on rails which are stiff enough for the traffic. Furthermore, it is very essential to an accurate record that the independent bars of the supporting-frame, which carry the scriber-arm and the record-strip, respectively, should be prevented from any lateral tilt or rocking movement other than that produced by the deflection of the rail under its load, as such unintentional tilting or rocking movement, no matter how slight it be, would tend to exaggerate the record.

In the accompanying drawings, Figure 1 is a top plan view of a portion of a track, showing the connected instruments in their operative positions on the two rails. Fig. 2 is a top plan view of one of the instruments in detail as it appears before it is secured to the rail. Fig. 3 is a view of the same in side elevation, showing in dotted lines the position which the base of the rail assumes when the instrument is attached to the rail; and Fig. 4 is an end view.

As the two connected instruments are quite similar in all respects save only that the one is provided with means for drawing the strip through the two instruments and the other with a support for holding a supply of the record-strip to be drawn through the instruments, the description will be confined to one of these instruments excepting the particulars named.

The supporting-frame consists of supporting-bars A A', held parallel to one another and spaced apart by a pair of spacing-bars B B', which are removably secured to the bars A A' and so fitted as to hold the bars A A' accurately spaced until the two bars A A' have been firmly connected to the base of the rail when the spacing-bars B B' are to be removed in order to permit the bars A A' to act independently of one another and conform to the deflection of the base of the rail under its load. The opposite ends of each of the bars A A' are provided with overhanging brackets C C', carrying powerful set-screws $c$ for forcing the base of the rail down onto sharp retaining-points $a$ a distance determined by stops $a'$, set in the upper edge of the bar with their free ends a short distance below the apex of the point $a$. In the present instance I have provided the bars with three points $a$ near each end and have made one of the brackets—in the present instance C'—adjustable toward and away from the opposite bracket C to accommodate rail-bases of different widths. The means here provided for adjusting the bracket C toward and away from the opposite bracket consist of sets of perforations $a^2$ in the bar and corresponding perforations in the bracket, through which pins $a^3$ extend.

For the purpose of holding the bars A A' against any lateral tilting or rocking movement other than that caused by the deflection of the rail I provide supplemental brackets D D' in connection with the brackets C C' at one end of each of the bars A A'. The supplemental brackets D D' are each provided with a pair of jaws $d$ $d'$, adapted to receive between them the edge of the base of the rail, and these jaws are provided with set-screws (denoted by $d^2$ $d^3$) for the purpose of engaging the upper and under faces of the base of the rail to adjust the bracket and hold it in its normal position with relation to the main bracket C. The brackets D D' are pivoted in the outer arms of yokes E E' by carefully-ground pin-and-socket joints $e$ $e'$ at their upper and lower ends, respectively. The inner arms of the yokes E E' are in a similar manner connected to the outer portions of the brackets C C', and hence any elongation or compression of the base of the rail intermediate of the bracket C or C' and its auxiliary D or D' will not affect the position of the bar A or the bar A', for the reason that the bracket D or D' will be free to swing horizontally on its pivots $e$ $e'$ to account for any elongation or compression which may take place, while at the same time the bar A will be held, by means of the auxiliary bracket, against any rocking or tilting movement in a vertical plane because of the depth of the yoke E or E' and its rigidity in that direction. Any tendency of the bracket D or D' to be crowded out of a right line by its swinging movement on the points $e$ $e'$ will be accounted for by the limited swinging movement of the yokes E E' in a horizontal plane on their connections with the brackets C C'.

The scriber-arm for recording the amount of elongation and compression of the rail between the points where the bars A A' are secured to it is denoted by F. It is pivoted with great care to a support G, fixed on one of the bars—in the present instance on the bar A—and extends thence to a point above the channel for the record-strip, where it is provided with a scriber $f$ of any well-known or approved form. The scriber-arm for drawing the reference-line of the record-strip is denoted by F' and is fixed at one end to a plate H on the bar A', its opposite end being provided with a scriber $f'$ of any well-known or approved form and preferably located in proximity to the scriber $f$ on the arm F. The plate H is removably secured to the bar A' and forms the top of a channel $i$ in the upper face of a channel-plate I, fixed to and resting on the upper face of the bar A'. The channel $i$ in depth and width is made to correspond as closely as may be to the thickness and width of the record-receiving strip K, so that the latter while having sufficient freedom to be drawn longitudinally through the channel shall have at the same time as little play both vertically and laterally as is consistent with a freedom of movement longitudinally. Through the plate H there is formed an opening $h$ directly over the channel $i$, through which opening the scribers $f$ and $f'$ pass into engagement with the record-receiving strip K.

To hold the record-receiving strip K against the slightest lateral movement at the point where the scribers engage it, I provide spring-actuated presser-pins $h'$, which have a sliding movement laterally with respect to the bar A' toward and away from the edge of the record-receiving strip K at the point opposite where the scribers engage it, and when in operation the said presser-pins $h'$ are pressed against the edge of the record-receiving strip by means of bar-springs $h^2$, fixed at one end to the side of the channel-plate I and with their free ends resting against the outer ends of the pins $h'$.

Up to this point the two instruments are similar in their construction. For the purpose of coupling them to act simultaneously in producing a record on the strip K, I move the strip K simultaneously beneath the scribers on the two instruments. To accomplish this, I draw the strip K from a supply-drum L of any well-known or approved form suitable for holding the strip, attached to the outer end of the bar A' of one instrument, thence beneath the rail and into engagement with the scribers of that instrument, thence beneath the opposite rail and beneath the scribers of that instrument to and between a set of feed-rollers M M', mounted in a support fixed to the bar A' and geared to rotate together by intermeshing spur-wheels $m$ $m'$. The wheels $m$ $m'$ are driven by means of a worm-wheel $m^3$, fixed to rotate with one of the spur-wheels—in the present instance with the spur-wheel $m'$—and operated by a worm $m^4$, actuated by a motor N, electric or other motor of any well-known or approved form. (Shown conventionally in Fig. 1.)

The operation as a whole may be briefly stated as follows: First place the instruments in position directly opposite one another on the two rails of a track before removing the spacing-bars B B'. Then secure the auxiliary brackets in their positions and remove the spacing-bars B B'. The record-receiving strip may then be passed from the instrument on one rail across to the instrument on the opposite rail and engaged with the feed-rollers. When a train is approaching, the motor may be brought into action and the record-receiving strip K continuously drawn along beneath and in engagement with the scriber. As the sets of wheels pass over that portion of the track included between the bars A A' the amount of elongation and compression of the metal in the base of the rail will be indicated by the lateral movement of the scriber $f$, while a continuous reference-line will be drawn on the strip by the scriber $f'$.

The difference in the effects produced by the corresponding wheels on the two rails due to the lateral rolling or rocking action of the train may be taken into account in determining the effect upon the rails due to the actual load or weight or pounding of the wheels, and thus the question of sufficiency or insufficiency of the rail for the purposes of traffic may be more accurately determined.

It is obvious that changes might be resorted to in the form and arrangement of the several parts without departing from the spirit and scope of my invention. Hence I do not wish to limit myself strictly to the structure herein set forth; but

What I claim is—

1. In an instrument for testing railway-rails under moving trains including a record-receiving and record-making device; supporting-bars, main clamping devices for clamping the said bars to the opposite flanges of the base of the rail to segregate a portion of the rail to be tested, and an auxiliary clamping device arranged to engage the base of the rail at a distance from the main clamping device in a direction lateral with respect to the supporting-bar to prevent the unintentional lateral tilt of the supporting-bar, substantially as set forth.

2. In an instrument for testing railway-rails under moving trains, the combination with supporting-bars, a record-receiving and record-making device supported independently of each other, the one by one of the supporting-bars and the other by the other of the supporting-bars, of main clamping devices for clamping the supporting-bars to the opposite flanges of the base of the rail to segregate a portion of the rail to be tested, an auxiliary clamping device arranged to engage the base of the rail at a distance from the main clamping devices and means for permitting the said auxiliary clamping device to move horizontally with the base of the rail while preventing it from tilting independently of the main clamping device, substantially as set forth.

3. In an instrument for testing railway-rails including a record-receiving and record-making device; a supporting-bar, means for clamping the supporting-bar to the base of the rail, an auxiliary clamping device for engaging the base of the rail at a distance from the main clamping devices and a yoke for supporting the auxiliary clamping device, the said yoke being pivotally connected with the main and auxiliary clamping devices to swing horizontally, substantially as set forth.

4. The combination with instruments adapted to be secured to the opposite rails of a track one to each for determining the amount of elongation and compression of the bases of the rails, of a record-receiving strip connecting the instruments and means for moving the record-receiving strip simultaneously along the instruments, substantially as set forth.

5. The combination with the clamp-supporting bars, a scriber-arm and its scriber pivoted to one of the bars and having its free end extended over another of the bars, of a channel for the record-receiving strip extending beneath the said scriber, a record-receiving strip adapted to pass along said channel and means for advancing the strip, substantially as set forth.

6. The combination with the clamp-supporting bars, a scriber-arm pivoted to one of the bars and a scriber carried by said arm, of a channel located beneath the scriber, a record-receiving strip adapted to pass along the channel, means for advancing the strip and means for holding the strip against lateral displacement within the channel, substantially as set forth.

7. The combination with the channel for receiving the record-strip, the record-strip and means for advancing it, of a scriber in position to engage the strip and a spring-actuated presser-pin in engagement with the edge of the strip for holding it against lateral displacement, substantially as set forth.

In testimony that I claim the foregoing as my invention I have signed my name, in presence of two witnesses, this 22d day of October, 1898.

PLIMMON H. DUDLEY.

Witnesses:
C. H. CHIPMAN,
F. H. RATCLIFFE